April 16, 1929.  W. M. BAXTER  1,708,998
CONTINUOUS OPERATION ABSORPTION ICE MACHINE
Filed March 31, 1926
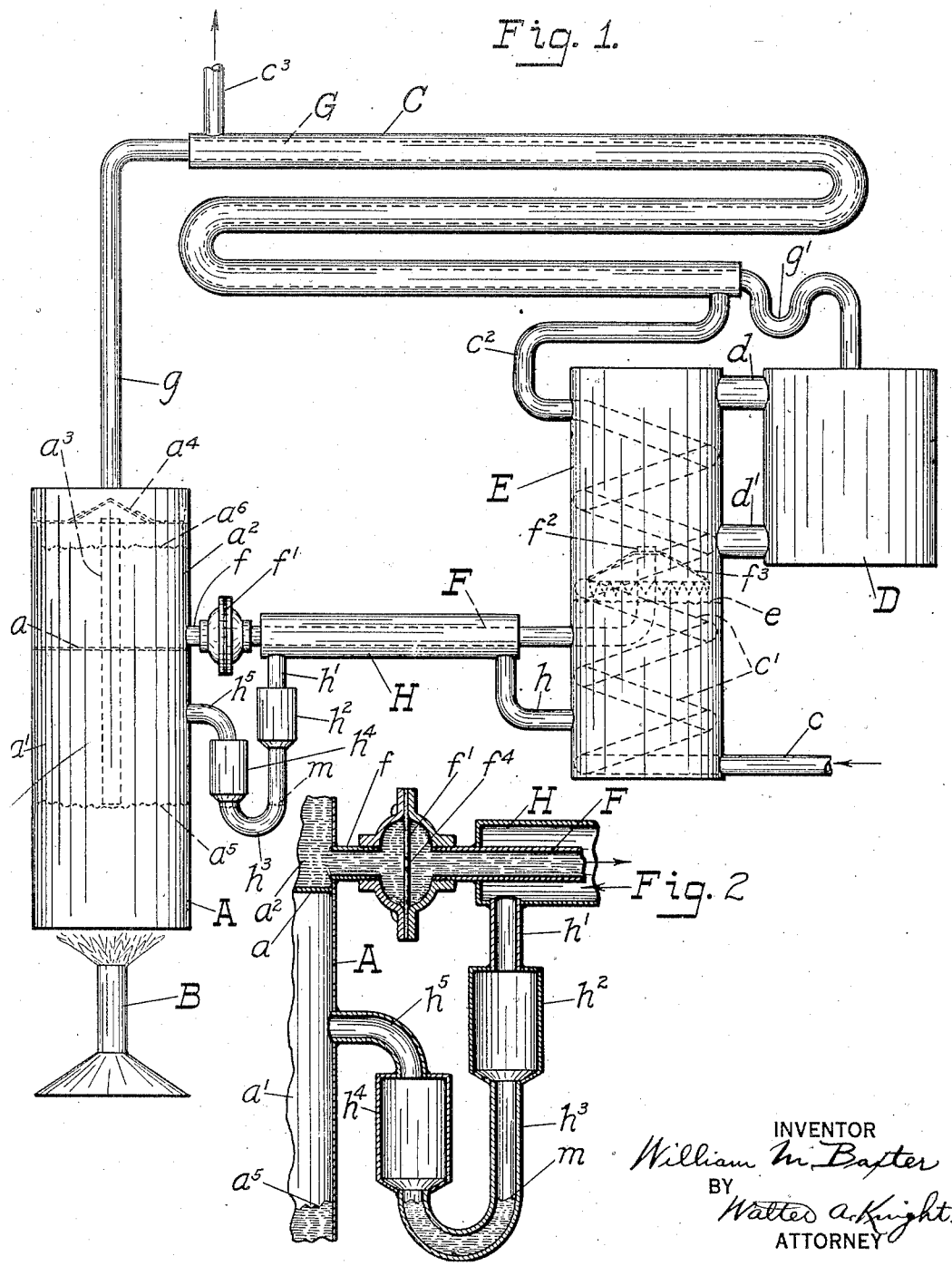

Patented Apr. 16, 1929.

1,708,998

UNITED STATES PATENT OFFICE.

WILLIAM M. BAXTER, OF FORT WAYNE, INDIANA, ASSIGNOR, BY MESNE ASSIGNMENTS, TO THE WAYNE HOME EQUIPMENT COMPANY, OF FORT WAYNE, INDIANA, A CORPORATION OF MARYLAND.

CONTINUOUS-OPERATION ABSORPTION ICE MACHINE.

Application filed March 31, 1926. Serial No. 98,755.

My invention relates to refrigerating apparatus of the absorption type and particularly to continuous operation absorption ice machines adapted for domestic and other small installations.

The principal object of my invention is to provide a refrigerating apparatus of the absorption type continuous in its operation and utilizing no mechanical means for circulating the refrigerant.

Another object of my invention is to provide an efficient absorption refrigerating apparatus adapted to occupy a small space and in which the differential in liquid heads is maintained by means of a liquid or other valve.

My improved apparatus preferably employs a liquid valve to maintain a differential in hydrostatic head equal to the difference between the liquid level in the primary boiler and that in the secondary boiler. It lifts the weak liquor by heat to an elevation within the hermetically sealed system to gain potential energy, so that the refrigerant will circulate by gravity from the point of elevation back to the primary boiler.

In the particular embodiment of my invention selected for illustration,

Figure 1 is a continuous operation absorption refrigerating machine shown somewhat diagrammatically, in side elevation, and Fig. 2 is an axial section through the diaphragm, manometer and contiguous parts; other parts of the apparatus being broken away.

Referring now to the drawings, the apparatus of the system consists of a generator A, a cylindrical tank set on end divided into two chambers by a horizontal plate $a$. The lower chamber $a^1$, which is the primary boiler, is connected with the upper chamber $a^2$, which is the secondary boiler, by means of an open-ended tube $a^3$, of such length and so positioned that part of the liquid ammonia or other refrigerant used will be forced through this tube from the chamber $a^1$ when the refrigerant is heated, into the chamber $a^2$.

A burner B is used to heat the refrigerant, a portion of which always remains in the chamber $a^1$ to approximately the height indicated by the line $a^5$. Above the upper end of the tube $a^3$ is a conical deflector $a^4$ which functions as a dehydrator, causing entrained moisture to be precipitated and fall into the upper chamber where liquid normally stands to about the height indicated by the line $a^6$.

The ammonia gas passes from the chamber $a^2$ through the pipe $g$ into the condenser coil G from which it flows to the condenser unit D through the goose-neck bend $g^1$, which acts as a liquid seal for the liquefied anhydrous ammonia.

The condenser unit D is connected with the absorber E by relatively large tubular connections, designated the one above as $d$ and the one below as $d^1$.

Cooling water flows in through the pipe $c$, through the coil $c^1$ within the absorber E, into the pipe $c^2$, thence through the cooling coil C, which forms a jacket for the condenser coil G, and out of the system through the pipe $c^3$.

The normal liquid level in the absorber E is indicated by the line $e$.

From near the bottom of the chamber $a^2$ leads off a pipe $f$ through which the weak liquor flows from said chamber through the connection $f$, restricting orifice $f^4$ in the diaphragm $f^1$, thence through the pipe F into the absorber E where said pipe terminates in a vertical portion $f^2$, above the normal level of the liquid in said absorber.

From the open end of this pipe $f^2$ flows the weak liquor out onto a distributing apron $f^3$ in order that it will have the greatest spread possible so as to cause it to rapidly absorb the gas which is coming from the condenser unit D through the connection $d^1$. In falling the weak liquor takes up ammonia gas and becomes rich liquor.

The portion of the cooling coil $c^1$ functions to carry away the heat of absorption due to combining anhydrous ammonia with the weak ammoniacal liquor which has been delivered to it from the chamber $a^2$.

The rich liquor in the bottom of the absorber E flows through the pipe $h$ into the portion H which forms a jacket for the pipe F, and acts as a counter-current temperature exchanger, thence through the pipe $h^1$ into the enlargement thereof $h^2$, down through the U-tube portion $h^3$, which forms a trap, up through another enlarged portion $h^4$, and through the bend $h^5$ into the chamber $a^1$ above the normal liquid level.

The flow of weak liquor out of the chamber $a^2$ and the flow of the rich liquor into the chamber $a^1$ takes place counter-currently in affecting the temperature exchange, the hot weak liquor giving up its heat to the returning cooled rich liquor.

The space above the liquid level $e$ in the absorber E and in the condenser unit D is partially filled with an exceedingly light gas inert as to the refrigerant employed as, for example, hydrogen when ammonia is used. Liquefied ammonia coming through the goose-neck bend liquid seal $g^1$ falls into the condenser unit D, and in coming in contact with the inert hydrogen the gas suffers a drop in temperature at constant pressure and mixes with the hydrogen, which fact was discovered by the German chemist Louis Geppert.

The new combination that is formed being heavier than either the anhydrous ammonia or hydrogen alone, falls to the bottom of the condenser chamber D, flows through the pipe $d^1$ and into the absorber E. There, weak liquor being injected through the pipe $f^2$ and spread over the apron $f^3$, readily absorbs the anhydrous ammonia from the hydrogen and the anhydrous ammonia leaves the hydrogen free. Due to its extreme lightness, the hydrogen rises to the top of the gas space in the absorber E and re-enters the condenser chamber D through the pipe $d$, and is then ready to be re-entrained with the incoming anhydrous ammonia.

In order to cause the refrigerant to flow automatically, continuously and without the intervention of any mechanical means, I use gravity in the following manner:

The connection formed by the parts $h^1$, $h^2$, $h^3$, $h^4$ and $h^5$, heretofore described, is filled with mercury to the level $m$ and constitutes a manometer, one leg of which is longer than the other for the purpose of creating a pressure differential between the liquid level heights of the absorber E and the generator A. The mercury may be left out and liquid refrigerant will function as a valve. By this means the liquid is caused to flow constantly from the chamber $a^2$ to the absorber E and return from the absorber E to the chamber $a^1$ through the manometer by gravity.

In the use of the apparatus the generator A is filled completely with a rich ammoniacal aqueous solution. Upon applying heat through the burner B, distillation of said solution takes place, forcing the excess liquid in the form of gas and weak solution up through the pipe $a^3$ into the chamber $a^2$ above the partition $a$.

Obviously many changes may be made in the apparatus without departing from the spirit of my invention, and I claim as within the scope of my invention all forms of apparatus readable on the claims.

I claim as my invention and desire to secure by Letters Patent of the United States:

1. An absorption refrigerating apparatus having a generator, a condenser and an absorber, a dehydrator in conjunction with the generator, fluid connections to permit weak liquor to flow from said generator into said absorber and an apertured diaphragm therein, fluid connections to permit rich liquor to flow from said absorber into said generator, and means for maintaining the continuity of said flows by gravity because of the differential in liquid heads in said apparatus.

2. An absorption refrigerating apparatus comprising a tank having a primary boiling chamber and a secondary boiling chamber, a fluid connection between said primary and secondary boiling chambers, means for maintaining a quantity of liquid refrigerant in said primary boiling chamber, means for maintaining a quantity of liquid refrigerant in said secondary boiling chamber, a condenser, an absorber, fluid connections to permit weak liquor to flow from said secondary boiling chamber into said absorber and an apertured diaphragm therein, fluid connections to permit rich liquor to flow from said absorber into said primary boiling chamber, and means for maintaining the continuity of said flows by gravity because of the differential in liquid heads in said apparatus.

3. An absorption refrigerating apparatus comprising a tank having a generator divided into an upper and a lower chamber with a fluid connection between them, means for maintaining a quantity of liquid refrigerant in each chamber, a condenser, an absorber, fluid connections to permit weak liquor to flow from said upper generator chamber into said absorber and an apertured diaphragm therein, fluid connections to permit rich liquor to flow from said absorber into said lower generator chamber, and a trap in said last named connections.

4. An absorption refrigerating apparatus comprising a tank having a primary boiling chamber and a secondary boiling chamber, a fluid connection between said primary and said secondary boiling chambers, a dehydrator, a cooling chamber with a liquid seal therein connecting said secondary boiling chamber to a condensing chamber, said condensing chamber, an absorber chamber, two fluid connections one above the other between said condensing chamber and said absorber chamber, a connection to convey weak liquor from said secondary boiling chamber into said absorber chamber and an apertured diaphragm therein, all said chambers and conduits in open connection, a connection to convey rich liquor from said absorber into said primary boiling chamber, and a valve in said last named connection for maintaining, during the operation of the apparatus, the constant circulation in one direction by the differential in liquid heads in said apparatus, said rich liquor connection forming a jacket for said weak liquor connection so that said connections function as a counter-current temperature exchanger.

5. An absorption refrigerating apparatus having a primary boiling chamber, a secondary boiling chamber, means for heating the contents of said boiling chambers, fluid connections between said primary and said secondary boiling chambers for conveying fluid from the former to the latter, means for maintaining a quantity of liquid refrigerant in said primary boiling chamber, means for maintaining a quantity of liquid refrigerant in said secondary boiling chamber, a dehydrator in connection with said secondary boiling chamber, a cooling connection from said secondary boiling chamber to a condenser chamber in which the liquid refrigerant comes in contact with a light gas inert as to said refrigerant, said condenser chamber, an absorber chamber, a plurality of fluid connections between said condenser chamber and said absorber chamber, a connection to convey weak liquor from said secondary boiling chamber below the liquid level thereof into said absorber chamber above the liquid level thereof and an apertured diaphragm therein, all said chambers and conduits in open connection, a connection to convey rich liquor from said absorber chamber below the liquid level thereof into said primary boiling chamber above the liquid level thereof, and a manometer in said last named connection for maintaining, during the operation of said apparatus, the constant circulation of refrigerant in one direction by the differential in liquid heads in said apparatus.

6. An absorption refrigerating apparatus having in combination, a distillating generator, a primary boiling chamber below and a secondary boiling chamber above in said generator, means for heating said chambers, an open ended tube connecting said chambers, a dehydrating deflector above said tube and within said secondary boiling chamber, means for maintaining liquid refrigerant in each of said chambers, a condenser chamber containing a light gas inert as to the refrigerant used with which the refrigerant comes into contact, a condensing coil connecting said secondary boiling chamber and said condenser chamber to convey refrigerant from said first named chamber to said second named chamber, a liquid seal in said connection, an absorption chamber, a cooling coil through which water flows entering near the bottom of said absorption chamber and leaving near the top thereof, and surrounding and jacketing said condenser coil above said last named chamber, liquid connections between said absorption and condenser chamber, a liquid connection between said secondary boiler and said absorption chamber to convey weak liquor and an apertured diaphragm therein, a connection to convey rich liquor from said absorption chamber below the liquid level thereof into said primary boiler above the liquid level thereof, a part of said connection forming a jacket around a part of said connection conveying weak liquor and a trap in said rich liquor conveying connection maintaining during operation of the apparatus, a circulation of refrigerant in one direction only by the differential in liquid heads in said apparatus.

In testimony whereof I have hereunto set my hand.

WILLIAM M. BAXTER.